(12) United States Patent
Wang

(10) Patent No.: US 7,898,098 B2
(45) Date of Patent: Mar. 1, 2011

(54) ASYMMETRIC HYDRAULIC PRESS ELECTRIC GENERATOR

(76) Inventor: Baitao Wang, Belchertown, MA (US)

( * ) Notice: Subject to any disclaimer, the term of this patent is extended or adjusted under 35 U.S.C. 154(b) by 366 days.

(21) Appl. No.: 12/075,752

(22) Filed: Mar. 13, 2008

(65) Prior Publication Data

US 2009/0273190 A1   Nov. 5, 2009

(51) Int. Cl.
*H02K 7/18* (2006.01)
*F02N 11/04* (2006.01)

(52) U.S. Cl. .......................................... 290/31; 290/1 A
(58) Field of Classification Search ................ 290/1 R; 60/398, 698, 504, 507
See application file for complete search history.

(56) References Cited

U.S. PATENT DOCUMENTS

| | | | | |
|---|---|---|---|---|
| 4,206,608 A * | 6/1980 | Bell | ............... | 60/698 |
| 5,355,674 A * | 10/1994 | Rosenberg | ............... | 60/325 |
| 6,172,426 B1 * | 1/2001 | Galich | ............... | 290/1 R |
| 6,376,925 B1 * | 4/2002 | Galich | ............... | 290/1 R |
| 6,949,840 B2 * | 9/2005 | Ricketts | ............... | 290/1 R |
| 7,129,592 B1 * | 10/2006 | Yetter | ............... | 290/1 A |
| 7,530,760 B2 * | 5/2009 | Rastegar et al. | ............... | 404/10 |
| 7,541,684 B1 * | 6/2009 | Valentino | ............... | 290/1 R |
| 2004/0130158 A1 * | 7/2004 | Kenney | ............... | 290/1 R |
| 2005/0200132 A1 * | 9/2005 | Kenney | ............... | 290/1 R |
| 2006/0119102 A1 * | 6/2006 | Hershey et al. | ............... | 290/1 R |
| 2007/0085342 A1 * | 4/2007 | Horianopoulos et al. | ............... | 290/1 R |
| 2008/0083222 A1 * | 4/2008 | Hubert | ............... | 60/698 |
| 2008/0150297 A1 * | 6/2008 | Shadwell | ............... | 290/1 R |
| 2008/0157537 A1 * | 7/2008 | Richard | ............... | 290/1 R |
| 2008/0224477 A1 * | 9/2008 | Kenney | ............... | 290/1 R |

OTHER PUBLICATIONS

Beiser, Arthur. 1980. "Schaum's Outline of Theory and Problems of Applied Physics", SI (Metric) ed. New York: McGraw-Hill Book Co. pp. 29, 59-60, 67, 74,76, 80-81, 84, 86, 90, 112-113 and 164.
Hau, Eric. 2006. "Wind Turbines: Fundamentals, Technologies, Application, Economics", 2nd Ed., New York: Springer. pp. 290-291 and 306.
Serway, Raymond A. and Faughn, Jerry S. 1999. "College Physics", 5th ed. New York: Saunders College Publishing, pp. 228, 232, 235, 265 and 299.
Spera, David A., ed. 1994. "Wind Turbine Technology: Fundamental Concepts of Wind Turbine Engineering", New York: ASME Press., p. 191.
Yeaple, Frank., 1996, Fluid Power Design Handbook 3rd ed. New York: Marcel Dekker, Inc., pp. iii, 43-44, 48, 61, 171, 182-183 and 761.

* cited by examiner

*Primary Examiner* — Julio Gonzalez
(74) *Attorney, Agent, or Firm* — Doherty, Wallace, Pillsbury & Murphy, P.C.

(57) ABSTRACT

An asymmetric hydraulic press electric generator that converts mechanical energy to electrical energy using hydraulic pressure. The generator employs the principle that force acting on a small area can create a much larger force by virtue of hydrostatic pressure and that a large amount of energy can be carried by a small flow of highly pressurized fluid. Given that the device does not use any natural resources to produce electric power, it is a radically new method of generating clean, renewable energy. This innovative technology aims to change the current destructive cycle of energy production into a constructive cycle that benefits all.

15 Claims, 4 Drawing Sheets

ASYMMETRIC HYDRAULIC PRESS ELECTRIC GENERATOR

BACKGROUND OF THE INVENTION

1. Field of the Invention

This invention relates to systems of energy generation that can be used for sustaining and improving the world's productive energy capacity.

2. Background of the Invention

What is needed in the field of energy production is a means of generating energy, apart from other forms of energy generation including the use of fossil fuels, nuclear energy, water and wind, wherein such means of producing energy addresses the ever-expanding demand for energy in modern society in an efficient and cost-effective manner.

SUMMARY OF THE INVENTION

By using an asymmetric hydraulic press electric generator to generate energy, the invention stands as an alternative way of generating energy, apart from other forms of energy generation including the use of fossil fuels, nuclear energy, water and wind. The asymmetric hydraulic press electric generator employs some of the theory of hydraulics, whereby force acting on a small area can create a much larger force by virtue of hydrostatic pressure and by the principle that a large amount of energy can be carried by a small flow of highly pressurized fluid. Once the device has been activated, it can accomplish an astonishing array of functions: it can power large forms of transportation; it can be used as the sole source of energy for residential homes; it can be assembled into energy farms, similar to today's wind farms, and as an energy source for entire communities. The invention is thus a low-cost and highly efficient means of addressing the ever-expanding demand for energy in modern society. Accordingly, the invention provides a solution to many energy-related social and environmental problems such as pollution, global warming, the current energy shortage and even inflation due to rising energy costs. The ultimate goal of the invention is to bring about a more environmentally sound and prosperous future.

Compared to existing open systems of energy generation, the asymmetric hydraulic press electric generator of the present invention is a special closed system that continually circulates energy. The asymmetric hydraulic press electric generator requires only a portion of the total energy that it generates in order to keep it functioning.

The asymmetric hydraulic press electric generator includes two subsystems: a hydraulic subsystem and a generating subsystem. The hydraulic subsystem comprises the following: a hydraulic fluid tank, a filter, electric motors, pumps, a pressure pipe, a customized hydraulic motor (which is preferably used, for example, in various forms of transportation) or cylinder, an optional oil heat radiator, a gearbox, and a crank. The generating subsystem comprises the following: a generator, a regulator, a converter, two or more batteries, sensors, a signal control device, and a manual and automatic switchbox.

How these two subsystems interact to generate energy will become apparent from the following drawings and accompanying description.

DETAILED DESCRIPTION

Figure 1:
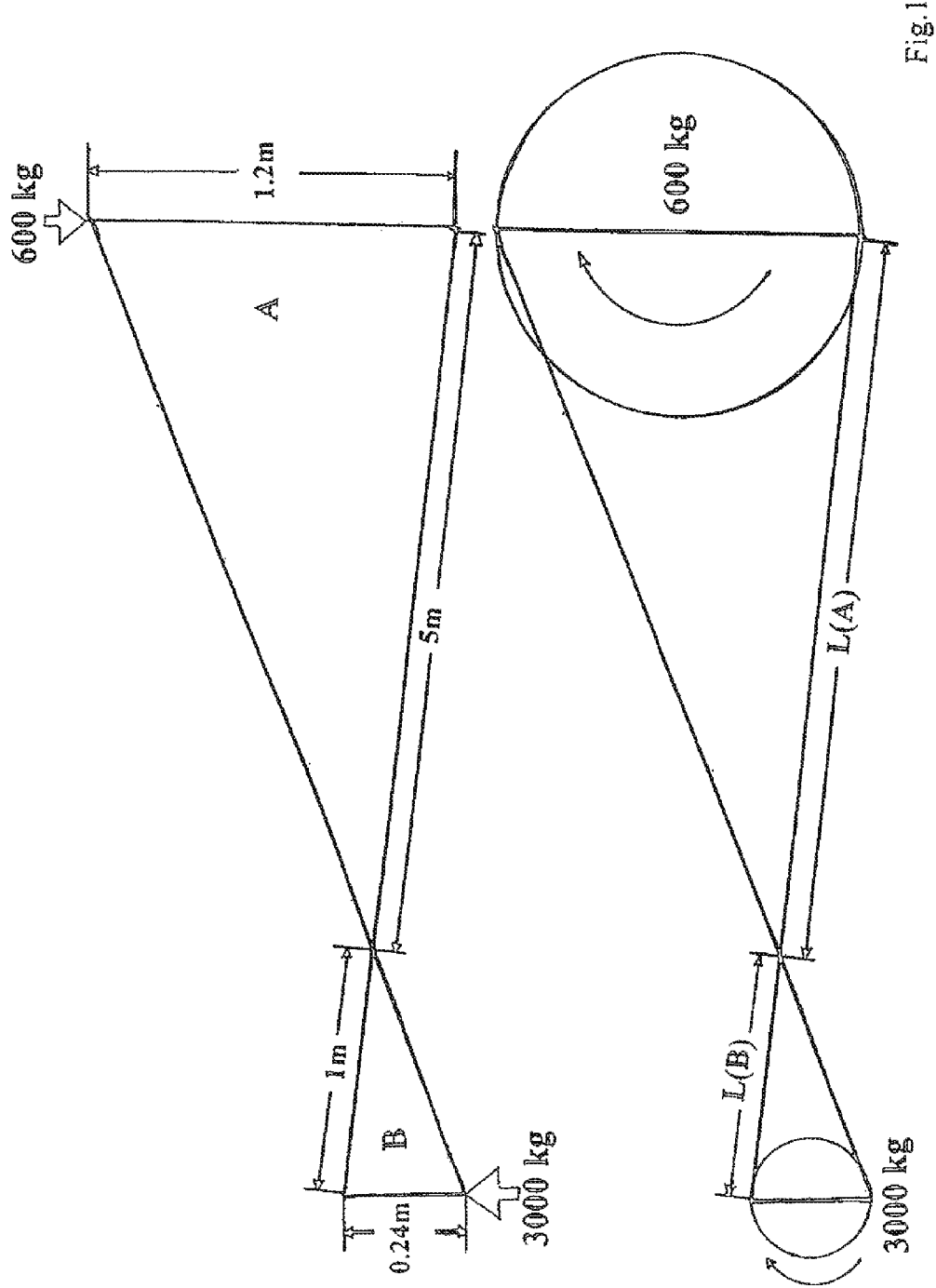
FIG. 1 is an illustration of the lever principle.
Figure 2:
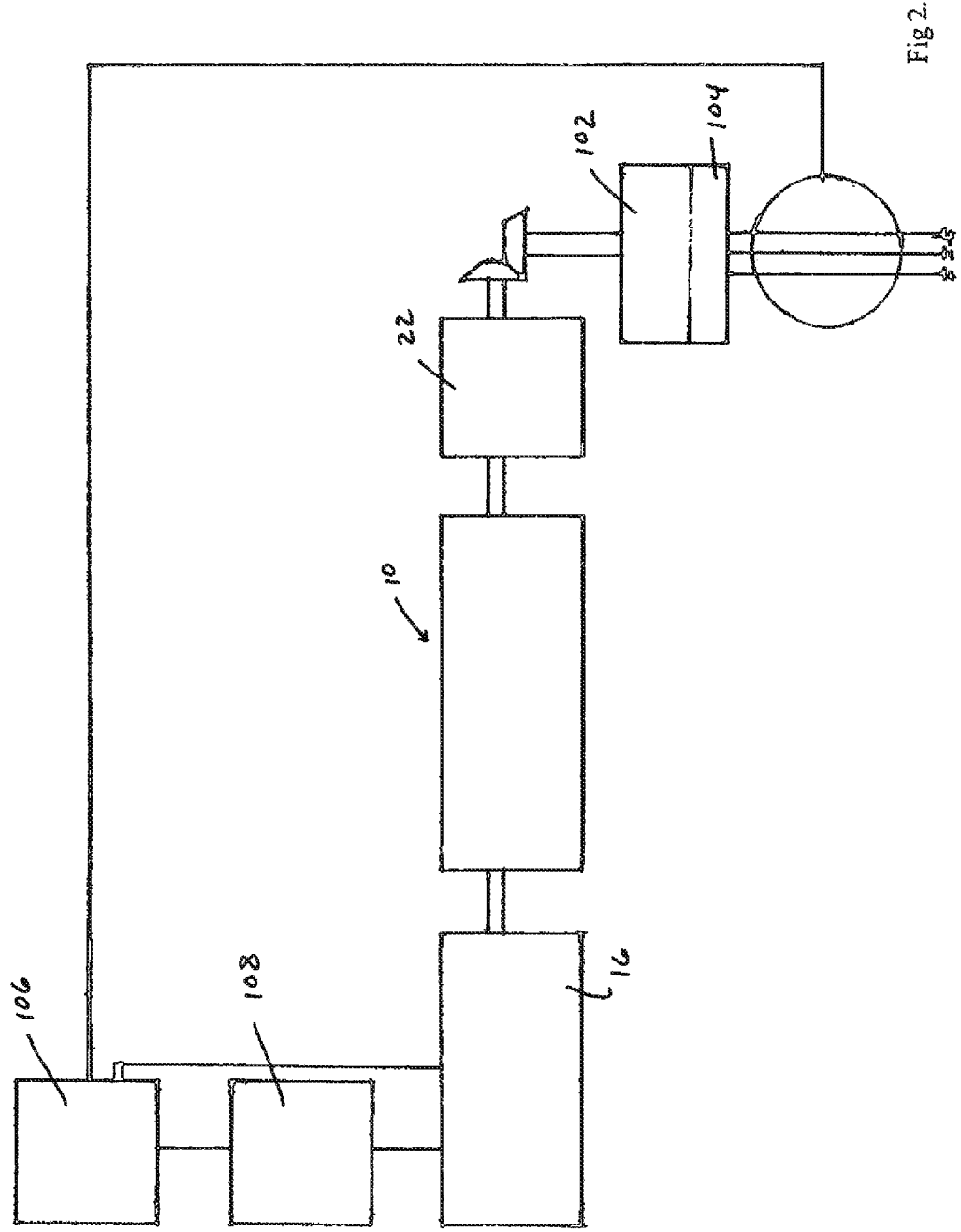
FIG. 2 is a schematic drawing of an exemplary asymmetric hydraulic press electric generator.

The asymmetric hydraulic press electric generator of the present invention comprises a hydraulic subsystem and a generating subsystem, wherein by pressurizing fluid the hydraulic subsystem generates an amount of force which is used by the generating subsystem to generate electrical energy. Additionally, as the asymmetric hydraulic press electric generator is a closed, energy recycling system, a portion of the electrical energy generated by the generating subsystem is used to power the hydraulic subsystem so that the hydraulic subsystem can generate additional force. Referring to the figures, an exemplary hydraulic subsystem 10 comprises a tank 12, a filter 14, an electric motor 16, a pump 18, a cylinder 20, a gearbox 22, a compound type sequence valve 24, and a directional control valve 26. An exemplary generating subsystem 100 comprises a generator 102, a regulator 104, a converter 106, batteries 108, sensors, a signal control device, and a manual and automatic switchbox.

FIG. 1 depicts the level principle upon which the present invention is at least partially based. Referring to FIG. 1, given that the asymmetric hydraulic press electric generator of the present invention comprises: (1) a hydraulic subsystem ("part A") and (2) a generating subsystem ("part B"), then it only need to be show that the force produced by part A is greater than the force needed by part B to generate electric power. A simple algebraic inequality can be used to illustrate this relationship:

First, it is observed that a-b is either positive, zero, or negative. Another way to say the same thing is to note that given two real quantities a and b, only one of the following is true:

$$a>b \quad a=b \quad a<b$$

Second, let us apply this statement to the amount of force generated or needed by the subsystems of the asymmetric hydraulic press electric generator, where a can be the amount of torque exerted by the hydraulic subsystem, and b can be the amount of torque needed by the generating subsystem. In our case, a-b is positive, or, $$a-b>0,$$

therefore, $$a>b$$

This is also to say that a can neither be equal to, nor lesser than, b.

Let us then conduct a theoretical experiment using the lever principle, to prove the inequality a>b.

The experiment is as follows: given a 6 m-long lever, the fulcrum divides the lever into a 5 m-long arm and a 1 m-long arm. A 3000-kg object is placed on the 1 m-arm of the lever. The question is: how much force must be applied on the 5 m-arm to balance the 3000-kg object?

According to the principle of mechanical advantage, we know that $$F(B)/F(A)=L(A)/L(B),$$

where F is the force, L is the lever arm, A is the longer arm and B is the shorter arm. Thus, $$F(A)=F(B)\times L(B)/L(A)=(3000\ kg\times 1\ m)/(5\ m)=600\ kg.$$

And since we know that $$w=mg,$$

Weight=mass×acceleration of gravity then, $$w=3000\ kg\times 9.8\ m/s^2=29400\ N,$$

and $$w=600\ kg\times 9.8\ m/s^2=5880\ N.$$

Therefore, $$F(A)=5880\ N\ and\ F(B)=29400\ N.$$

This means that 5880 N of force is needed to balance 29400 N of force on a lever with a 5:1 arm ratio. This balanced lever then creates two similar triangles relative to the ground, triangle A and triangle B. Triangle A has a base that is equal to L(A), or 5 m, and a height of 1.2 m. Triangle B has a base that is equal to L(B), or 1 m, and a height of 0.24 m.

Now let us assume that the 3000-kg object is a solid disk, and that the 600 kg needed to balance the lever is also a solid disk.

1.) First, let us introduce the concept of gravitational potential energy, where PEg=mgh, where m is mass, g is the gravitational force, and h is height.

Thus, $$PEg(A)=600\ kg\times 9.8\ m/s^2\times 1.2\ m=7056\ J$$

And $$PEg(B)=3000\ kg\times 9.8\ m/s^2\times 0.24\ m=7056\ J$$

In other words, the potential energy exerted by the longer lever arm A bearing the lighter 600-kg disk, is equal to the potential energy exerted by the shorter lever arm B bearing the heavier 3000-kg disk, because the height of lever arm A from the ground exceeds the height of lever arm B from the ground. Therefore, energy is neither gained nor lost in balancing the lever.

2.) Let us now turn to the concept of rotational kinetic energy, $KEr=(½)mv^2$, where m is mass and v is linear velocity, such that $v=\omega r$, where $\omega$ is angular velocity and r is the radius of the circle.

Thus, $$KEr=(½)m(\omega r)^2.$$

If we then suppose that both discs are rotating at 120 rpm, then $$\omega=120\ rpm\times 0.105\ (rad/s)/rpm=12.6\ rad/s.$$

Thus, $$KEr(A)=(½)600\ kg\times(12.6(rad/s)\times 0.6\ m)^2=17145\ J$$

and $$KEr(B)=(½)3000\ kg\times(12.6(rad/s)\times 0.12\ m)^2=3375\ J.$$

In other words, KEr(A)>KEr(B), or, the rotational kinetic energy exerted by the longer lever arm A bearing the lighter 600-kg disk exceeds the rotational kinetic energy exerted by the shorter lever arm B bearing the heavier 3000-kg disk. This may seem to contradict the fact that PEg(A)=PEg(B), but let us recall that the height of the lighter 600-kg disk from the ground (which we also know as the height of triangle A) exceeds the height of the heavier 3000-kg disk from the ground (which we also know as the height of triangle B).

This means that the angular momentum of the longer lever arm A exceeds the angular momentum of the shorter lever arm B when the disks rotate to create rotational kinetic energy. Now, let us also recall that the lever arm exhibits a 5:1 ratio. Under a normal torque transmission scenario with a gear, chain or belt instead of a lever, the lighter disc A, which is farther from the ground, would complete one turn for every five turns that the heavier disc B; which is closer to the ground, completes, and KEr(A) would equal KEr(B). However, with a lever, disc A completes one turn for every one turn that disc B completes. This means that a system which uses a lever gains four times the rotational kinetic energy than a system without a lever.

3.) Finally, putting it all together,
where TE is total energy $$TE(A)=KE(A)+PEg(A)=17145J+7056J=24201\ J,$$

$$TE(B)=KE(B)+PEg(B)=3375J+7056J=10431\ J,$$

Thus, $$TE(A)>TE(B).$$

If a is the amount of force applied to lever arm A and b is the amount of force applied to lever arm B, then we have proven that a>b. In other words, the force produced by part A of the fluid pressure exceeds the force produced by part B of the electric generator.

To summarize, the hydraulic subsystem produces more than enough force for the electric generator to function. This critical imbalance between the energy used versus the energy generated therefore renders it asymmetric and self-sufficient.

Operation.

Referring to the Figures, The asymmetric electric hydraulic press generator operates through the following steps:

(1) Turn on the switch. The electric current from the battery 108 will travel through the cable and start the motor 16 that runs the hydraulic pump 18.

Figure 3A:
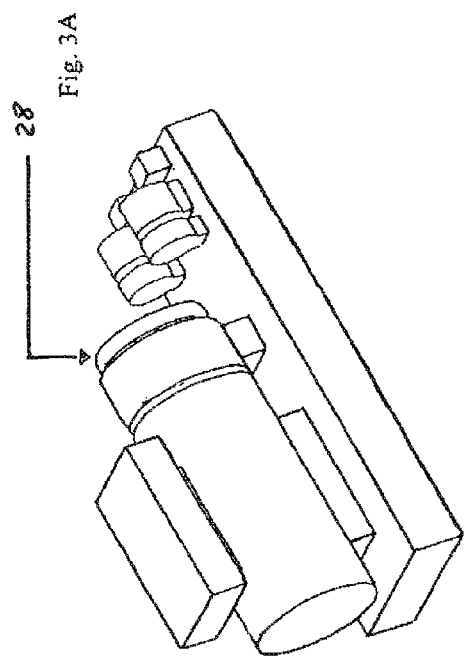
FIG. 3A is a three-dimensional illustration of the asymmetric hydraulic press electric generator depicted in FIG. 2.
Figure 3D:
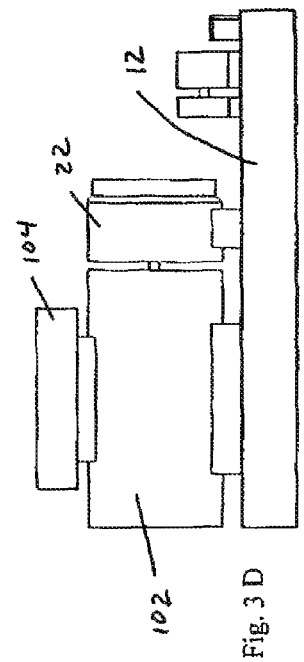
FIG. 3D is a lateral view of the asymmetric hydraulic press electric generator depicted in FIG. 2.
Figure 3B:
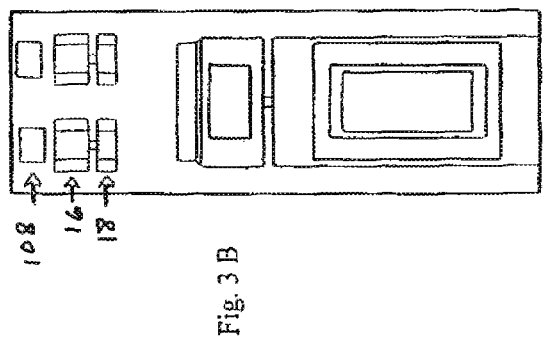
FIG. 3B is a perspective view of the asymmetric hydraulic press electric generator depicted in FIG. 2 taken from above.
Figure 3C:
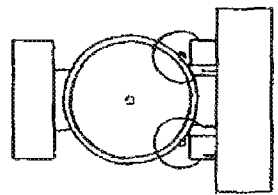
FIG. 3C is a head-on view of the asymmetric hydraulic press electric generator depicted in FIG. 2.
Figure 4:
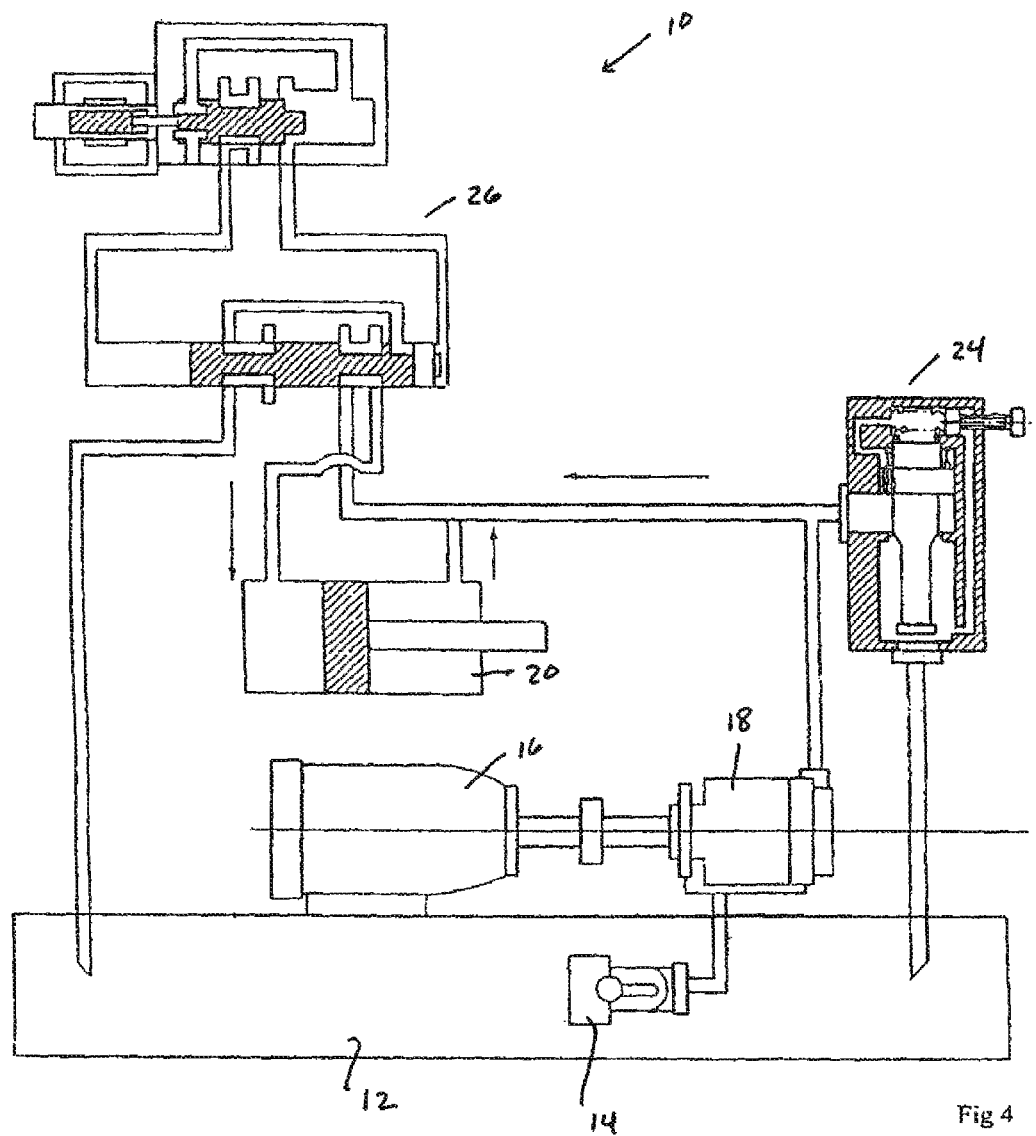
FIG. 4 is a detailed diagram depicting an exemplary hydraulic subsystem.

(2) Two running pumps each exert up to 3000 PSI of fluid power to turn over one or two customized cylinders 20 or a customized hydraulic motor (see FIG. 3A, reference numeral 28) which produces approximately 75400 lb of force.

(3) The two cylinders 20 turn a 6-inch diameter crank, producing approximately 230000 lb-in of torque to run the gearbox 22.

(4) The torque changes the speed of the gearbox 22 from 30 rpm or 60 rpm to 1800 rpm, turning over the 100 hp generator 102 at 1800 rpm.

(5) The 100 hp generator 102 produces 75 kw of electric power. 60 kw of electric power is needed to run through the converter 106 and the regulator 104 in order to keep the electric motor 16 running and recharge the battery 108. 15 kw are then available for other applications. A portion of the electric power produced is converted from alternate current to direct current to run the hydraulic components.

These five steps complete a single energy loop. Without any external disturbance, this process will continually repeat itself. Now, let us prove that each step is possible:

a) Since we know that the rate at which work is done to maintain an electric current is given by:

P=IV, where P is power, I is the current, and V is the potential difference, then, given that 1 hp=750 W, I=P/V=(80 hp×750 W)/12V=60000 W/12V=5000 A. Therefore, 5000 amperes of electric current is needed to start two 40 hp direct current electric motors.

If we use six 12V batteries (such as, for example Ever-Start® 12-V battery, part no. Maxx 65 N) cranking 1000 A at 32 degrees F., then we will have more than enough electric current to start two 40 hp direct current electric motors.

80 hp come from pump formulas:

HPin=GPM×psi 11714 Eff, where HPin is horsepower input, GPM is flow rate, Eff is efficiency (overall), HPin×GPM×psi/1714 Eff=40×3000/1714×0.9=77.77 hp b) Once the two electric motors begin to run two 20 GPM hydraulic pumps at 1800 rpm, the pumps will deliver both 3000 maximum PSI.

Since we know that the pressure exerted when a force acts perpendicular to a surface is:

p=F/A, where p is pressure, F is force, and A is the area, then, given that we use two customized 4-inch bore, 6-inch stroke and automatic return valve cylinders, or, one customized hydraulic motor:

$$\begin{aligned} F &= pA \\ &= p(3.14 \times r^2) \\ &= 3000 \; PSI \times ((3.14)(2 \; in^2)) \\ &= 3000 \; PSI \times 12.56 \; in^2 \\ &= 37681 \; lb. \end{aligned}$$

Therefore, the pumps exert a total of 3000 maximum PSI to turn over two customized cylinders or a customized motor producing 75362 lb of force.

c) Since the torque acting on a body can be defined as the product:

τ=Fr, where τ is torque, F is force, and r is radius, then,

τ=37681 lb×3 in=113043 lb-in.

Therefore, the two cylinders turn a 6-inch diameter crank, producing 2×113043 lb-in of torque to run the gearbox.

d) Since we know the cylinder speed, we can calculate its stroke.

V=231Q/720A, where Q is flow rate (gpm), A is area (square inches),

V=231×20/720×12.56=0.5 feet/s=6 in/s e) Use the hydraulic motor or the cylinders to rotate the gearbox. The input speed of the gearbox will be 30 rpm, while the output speed will be 1800 rpm.

Since t(out)=t(in) n(in)/n(out)=226086×30/1800=3768 lb-in, the input torque of the gearbox is therefore 226086 lb-in at 30 rpm, while its output torque is 3768 lb-in at 1800 rpm.

A decrease in torque is accompanied by an increase in the speed of rotation, while an increase in torque is accompanied by a decrease in the speed of rotation.

f) Use the gearbox to turn over the 100 hp generator at 1800 rpm. Since the transmitted torque can be expressed as:

τ=63025 H/n (lb-in), where H is in hp and n in rpm, then, the 100 hp generator generating 75 kW of electricity only needs τ=63025 (100)/1800=3501 lb-in.

Since the hydraulic subsystem produces 3768 lb-in of torque whereas the generating subsystem only needs 3501 lb-in of torque to generate 100 hp of electric power, then we do not need to consider any energy losses incurred during the generating process in order to prove that the entire system is viable.

The invention claimed is:

1. An asymmetric hydraulic press electric generator comprising a hydraulic subsystem and a generating subsystem, wherein said hydraulic subsystem comprises a first hydraulic pump, a hydraulic cylinder, a crank, and a gearbox, and wherein said generating subsystem comprises a battery, an electric motor, and a generator, wherein said hydraulic subsystem and said generating subsystem form a closed loop system for generating and recycling power, wherein said battery provides said electric motor with a source of electric power, and wherein said electric motor supplies said source of electric power directly to said first hydraulic pump to- runs said first hydraulic pump such that said hydraulic cylinder is actuated by said first hydraulic pump, wherein said actuation of said hydraulic cylinder turns said crank to thereby run said gearbox, which in turn actuates said generator such that said generator produces an additional supply of electric power, wherein a first portion of said additional supply of electric power is directly supplied back to said electric motor from said generator and used by said electric motor to run said first hydraulic pump to thereby repeat production of said hydraulic power, and a second portion of said additional supply of electric power is removed from said closed loop system and used to power another application.

2. The asymmetric hydraulic press electric generator of claim 1, wherein a third portion of said additional supply of electric power which is produced by said generator is supplied directly back to said battery from said generator for purposes of recharging said battery so that said battery can provide additional electric power to said electric motor such that said electric motor can directly actuate said first hydraulic pumps.

3. The asymmetric hydraulic press electric generator of claim 2, wherein said hydraulic subsystem further comprises a second hydraulic pump, wherein said electric motor uses said source of electric power to also run said second hydraulic pump.

4. The asymmetric hydraulic press electric generator of claim 3, wherein said crank produces approximately 230,000 lb-in of a torque.

5. The asymmetric hydraulic press generator of claim 4, wherein said torque changes a speed of said gearbox to up to about 1,800 rpm.

6. The asymmetric hydraulic press generator of claim 5, wherein said generator comprises a horsepower of 100, and further wherein said generator produces about 75 kw of electric power.

7. The asymmetric hydraulic press electric generator of claim 3, wherein said hydraulic subsystem further comprises a second hydraulic cylinder, wherein said second hydraulic pump actuates said second hydraulic cylinder, and further wherein said second hydraulic cylinder assists said first hydraulic cylinder in turning said crank to thereby assist in running said gearbox.

8. The asymmetric hydraulic press electric generator of claim 1, wherein said hydraulic subsystem further comprises a hydraulic fluid tank upon which is disposed said electric motor and said hydraulic pump.

9. The asymmetric hydraulic press electric generator of claim 8, wherein said generator, said crank, and said gearbox are disposed on said hydraulic fluid tank.

10. The asymmetric hydraulic press electric generator of claim 9, wherein said battery is disposed on said hydraulic fluid tank.

11. An asymmetric hydraulic press electric generator comprising a hydraulic subsystem and a generating subsystem wherein said hydraulic subsystem comprises a first hydraulic pump, a hydraulic motor, a crank, and a gearbox, and wherein said generating subsystem comprises a battery, an electric motor, and a generator, wherein said hydraulic subsystem and said generating subsystem form a closed loop system for generating and recycling power, wherein said battery provides said electric motor with a source of electric power, and wherein said electric motor supplies said source of electric power directly to said first hydraulic pump to runs said first hydraulic pump such that said hydraulic motor is actuated by said first hydraulic pump, wherein said actuation of said hydraulic motor turns said crank to thereby run said gearbox, which in turn actuates said generator such that said generator produces an additional supply of electric power, wherein a first portion of said additional supply of electric power is directly supplied back to said electric motor from said generator and used by said electric motor to run said first hydraulic pump thereby repeat production of said hydraulic power, and a second portion of said additional supply of electric power is removed from said closed loop system and used to power another application.

12. The asymmetric hydraulic press electric generator of claim 11, wherein a third portion of said additional supply of electric power which is produced by said generator is supplied back to said battery for purposes of recharging said battery so that said battery can provide additional electric power to said electric motor such that said electric motor can actuate said first hydraulic pump.

13. The asymmetric hydraulic press electric generator of claim 12, wherein said hydraulic subsystem further comprises a second hydraulic pump, wherein said electric motor uses said source of electric power to also run said second hydraulic pump, and further wherein said second hydraulic pump assists said first hydraulic pump in actuating said hydraulic motor.

14. The asymmetric hydraulic press electric generator of claim 13, wherein said crank produces approximately 230,000 lb-in of a torque.

15. The asymmetric hydraulic press generator of claim 14, wherein said torque changes a speed of said gearbox to up to about 1,800 rpm.

* * * * *